United States Patent [19]

Ruehle

[11] Patent Number: 4,488,270
[45] Date of Patent: Dec. 11, 1984

[54] ACOUSTIC IMPEDANCE LOG OBTAINED FROM SEISMOGRAMS

[75] Inventor: William H. Ruehle, Westport, Conn.

[73] Assignee: Mobil Oil Corporation, New York, N.Y.

[21] Appl. No.: 302,289

[22] Filed: Sep. 15, 1981

[51] Int. Cl.³ .............................................. G01V 1/28
[52] U.S. Cl. ........................................ 367/73; 367/46; 367/38; 364/421
[58] Field of Search ........................ 367/46, 73, 75, 74, 367/38; 364/421

[56] References Cited

U.S. PATENT DOCUMENTS

| | | | |
|---|---|---|---|
| 3,011,582 | 12/1961 | Peterson | 367/73 |
| 3,076,176 | 1/1963 | Lawrence | 367/46 |
| 3,076,177 | 1/1963 | Lawrence et al. | 367/46 |
| 3,312,934 | 4/1967 | Stripling et al. | 367/27 |
| 3,611,278 | 10/1971 | Guinzy et al. | 367/63 |
| 3,689,874 | 9/1972 | Foster et al. | 367/46 |
| 3,696,331 | 10/1972 | Guinzy et al. | 367/53 |
| 4,210,968 | 7/1980 | Lindseth | 367/46 |

OTHER PUBLICATIONS

Taner, M. and Koehler, F., "Velocity Spectra-Digital Computer Derivation and Applications of Velocity Functions," *Geophysics,* 12/69, pp. 859–881.
Sengbush et al., "Intrepretation of Synthetic Seismograms," *Geophysics,* 4/61, pp. 138–157.

Primary Examiner—Nelson Moskowitz
Assistant Examiner—Ian J. Lobo
Attorney, Agent, or Firm—Alexander J. McKillop; Michael G. Gilman; Charles J. Speciale

[57] ABSTRACT

In seismic exploration, an improved synthetic acoustic log is produced from seismograms by combining band limited reflectivity and velocity functions, both of which are obtained from the seismograms. The reflectivity function is obtained by deconvolving the field seismograms, transforming the reflectivity function so obtained into the frequency domain, and filtering the frequency domain representation to suppress frequencies below the seismic band. The velocity functions is obtained by applying a velocity spectra technique to the field seismograms to produce an acoustic log, transforming the acoustic log into the frequency domain, filtering to suppress all frequencies in the seismic pass band and converting back into the time domain.

4 Claims, 6 Drawing Figures

ND FROM SEISMOGRAMS

ACOUSTIC IMPEDANCE LOG OBTAINED FROM SEISMOGRAMS

BACKGROUND OF THE INVENTION

This invention relates to synthetic acoustic impedance logs and more particularly, to obtaining synthetic acoustic impedance logs having improved characteristics below the seismic pass band.

Acoustic logs are widely used in geophysical exploration. Well logging tools such as the one shown in U.S. Pat. No. 3,312,934—Stripling et al traverse a well bore to obtain logs of the acoustic velocity characteristics of the earth as a function of depth. Alternatively, the logs represent the acoustic impedance which is the product of acoustic velocity and density. As used herein, the term acoustic log means either acoustic velocity or acoustic impedance.

When there is not a well bore in the vicinity of the area being explored, synthetic acoustic logs have been obtained from seismograms which are shot from the surface of the earth. U.S. Pat. Nos. 3,076,176—Lawrence and 3,076,177—Lawrence et al describe the production of synthetic velocity logs from seismograms.

More recently, velocity spectra techniques have been used to obtain acoustic velocity from seismograms. U.S. Pat. No. 3,611,278—Guinzy and Ruehle, is an example of a velocity spectra technique which can be used to obtain an interval velocity log from seismograms.

Recent advances in the processing of seismograms have greatly improved the signal-to-noise ratio of the seismograms. In particular, common depth point shooting and processing techniques have greatly improved the appearance of reflections from common reflection points. In this procedure the field seismograms which contain reflections from common points are composited, or stacked, so that the reflection signals are emphasized relative to the noise.

Synthetic acoustic logs have been obtained from common depth point seismograms. However, these acoustic logs do not have good characteristics at frequencies below the seismic pass band.

It is an object of the present invention to produce synthetic acoustic logs which do have good characteristics at frequencies below the seismic band.

SUMMARY OF THE INVENTION

In accordance with the present invention, an improved synthetic acoustic log is obtained from seismograms by combining a reflectivity function which is band limited to those frequencies in the seismic pass band and a velocity function which is band limited to contain only those frequencies below the seismic pass band.

In carrying out the invention, the field seismograms are deconvolved to form a reflectivity function which is transformed into the frequency domain. This frequency domain representation is filtered to suppress all frequencies below the seismic pass band. The field seismograms are also processed by a velocity spectra technique to obtain an acoustic log. This acoustic log is transformed into the frequency domain and filtered to suppress all frequencies in the seismic pass band. The band limited reflectivity and velocity functions obtained in this manner are then transformed back into the time domain and combined to produce the improved synthetic acoustic log of the present invention.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
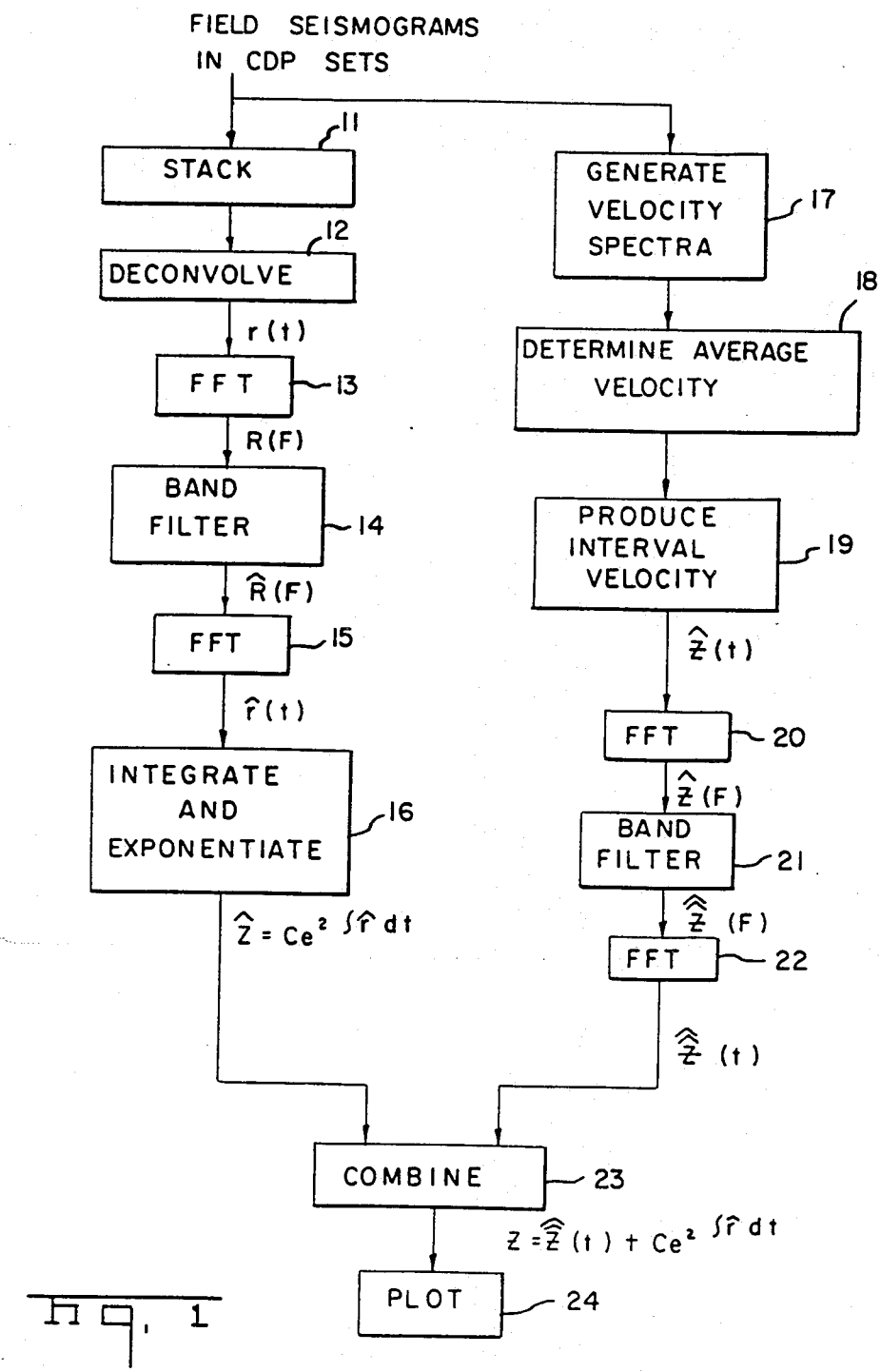
FIG. 1 shows the process of the present invention.

Referring to FIG. 1, the CDP sets of field seismograms are stacked as indicated at 11 in accordance with well known procedures. The stacked sets are then deconvolved as indicated at 12 to produce the reflectivity function which is denoted r(t). There are many well known deconvolution procedures. The deconvolution procedure referred to as "flatiron" and described in U.S. Pat. No. 3,689,874, Foster, et al is suitable for use.

The reflectivity function is transformed into a frequency domain representation of reflection amplitudes as a function of reflection frequency, this step being denoted by the reference numeral 13. This operation has become known in geophysical exploration as a FAST FOURIER TRANSFORM (FFT). One suitable procedure is described in Cooley, J. W., Tukey, J. W., AN ALGORITHM FOR MACHINE CALCULATION OF COMPLEX FOURIER SERIES, Mathematical Computation, Vol. 19, 1965, pp. 297–301. The frequency domain representation of the reflectivity function is R(f). This function is band pass filtered at 14 to suppress all frequencies below the seismic pass band. The band limited reflection function R(f) is formed. This is applied to the FFT 15 to convert it back into the time domain representation of amplitude as a function of time which is denoted r(t). In order to convert this band limited reflectivity function into an acoustic impedance log it is integrated and exponentiated as indicated at 16 to form the band limited acoustic impedance derived from the reflectivity function, and denoted Z.

The field seismograms are also applied to a velocity spectra process to produce an interval velocity log. This includes the steps of generating velocity spectra indicated at 17, determining average velocity indicated at 18 and producing an interval velocity log, indicated at 19. These steps are fully described in U.S. Pat. Nos. 3,611,278—Guinzy et al and 3,696,331—Guinzy et al. The output of the step 19 will be an interval velocity log such as that shown in FIG. 9 of Guinzy et al U.S. Pat. No. 3,611,278. This interval velocity log is transformed into the frequency domain by the FFT indicated at 20. The frequency domain representation of the interval velocity log is filtered by the band filter 21 to suppress all frequencies in the seismic band. In this way, the band limited velocity function Z(f) is obtained which has a good representation of the low frequency components of the acoustic impedance log. These low frequency components are present because the interval velocity log, obtained from the velocity spectra processes, has good low frequency characteristics.

The band limited velocity function is converted back to the time domain by the FFT 22. The band limited velocity and reflectivity functions are combined as indicated at 23 and the resultant signal is plotted at 24 to produce the synthetic acoustic logs of the present invention.

Figure 2:
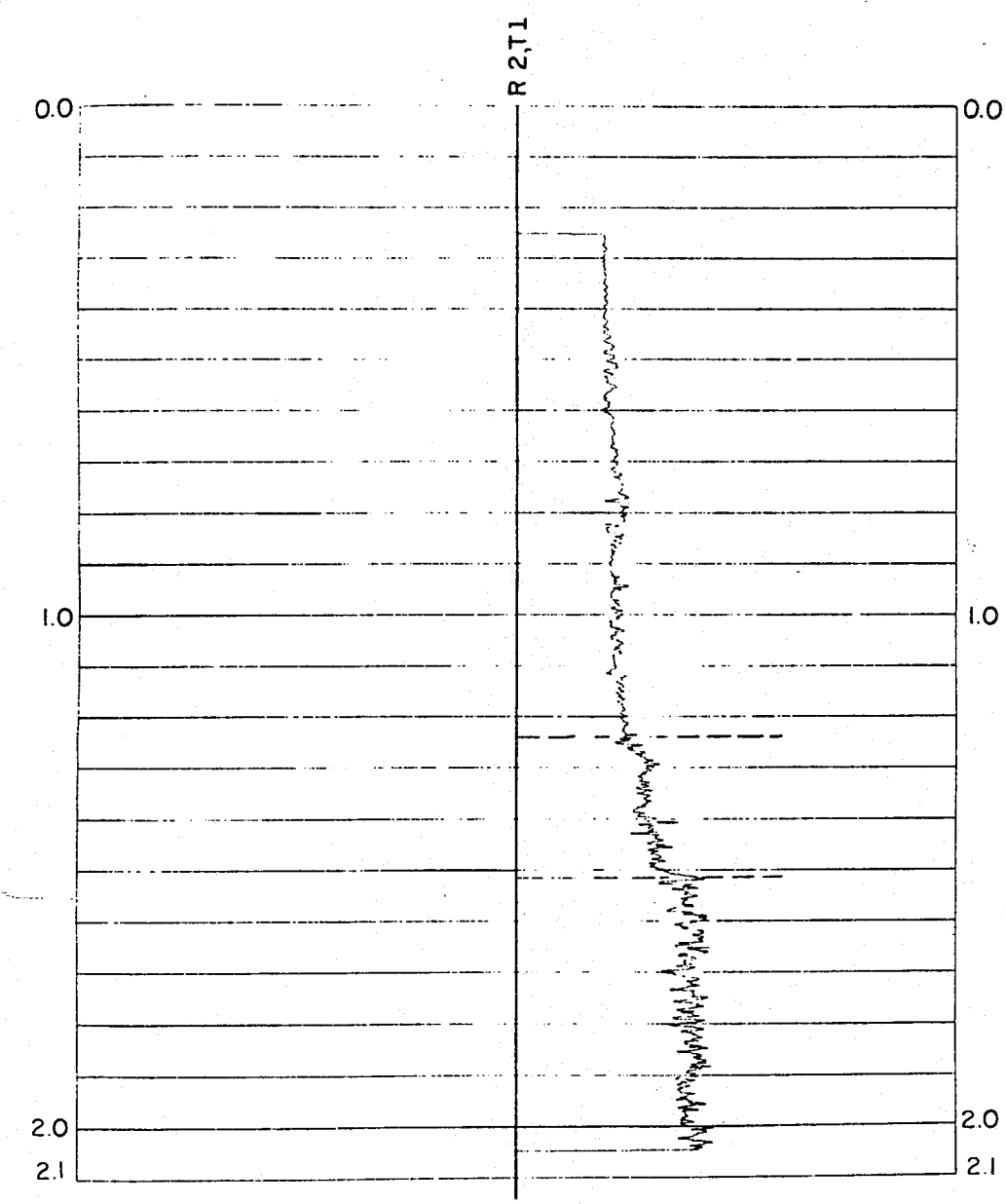
FIG. 2 shows an acoustic velocity log obtained by a logging tool traversing a bore hole.
Figure 3:
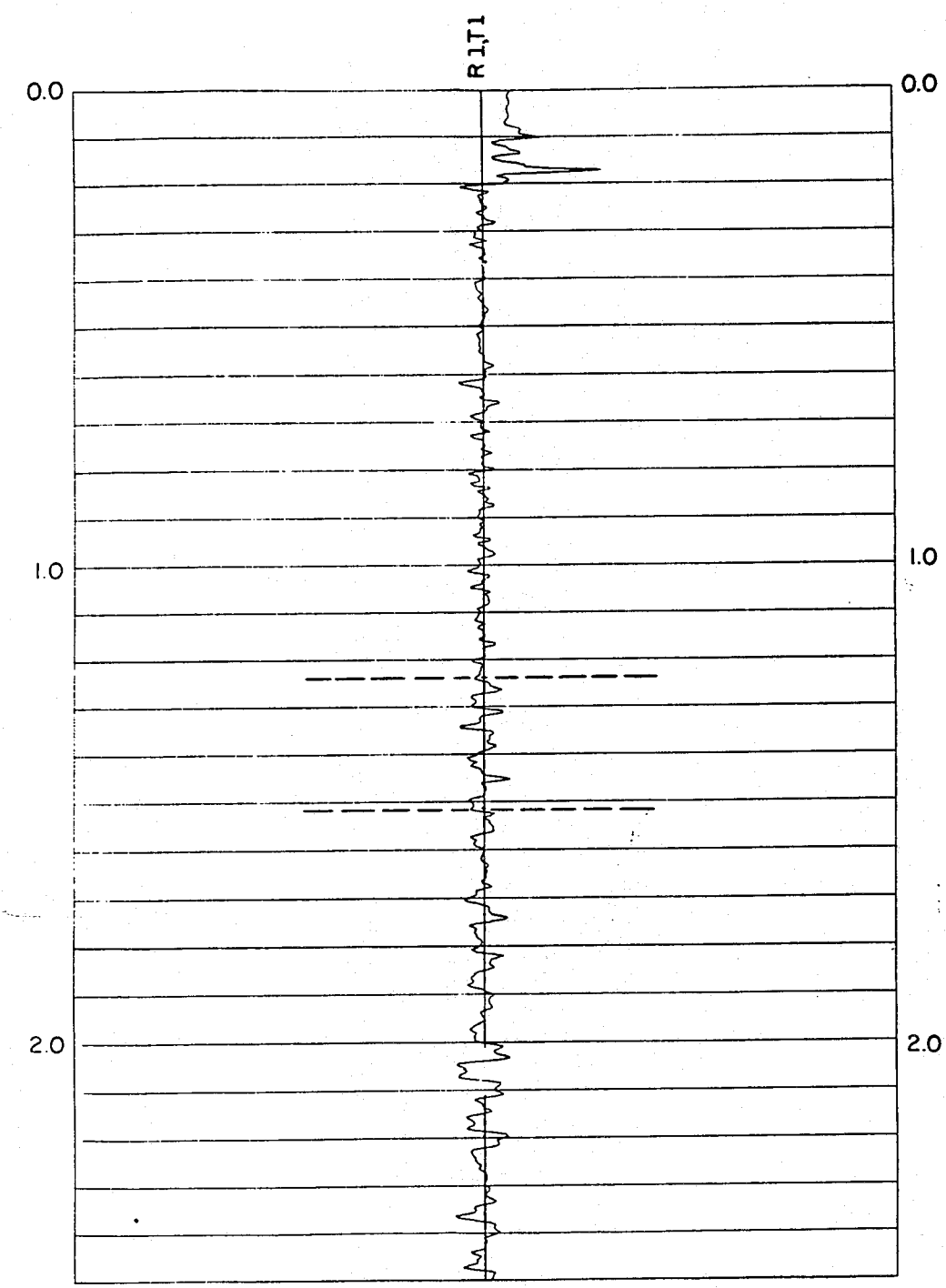
FIG. 3 shows a reflectivity function produced from seismograms obtained in the same vicinity as the well bore hole of the FIG. 2 log.
Figure 4:
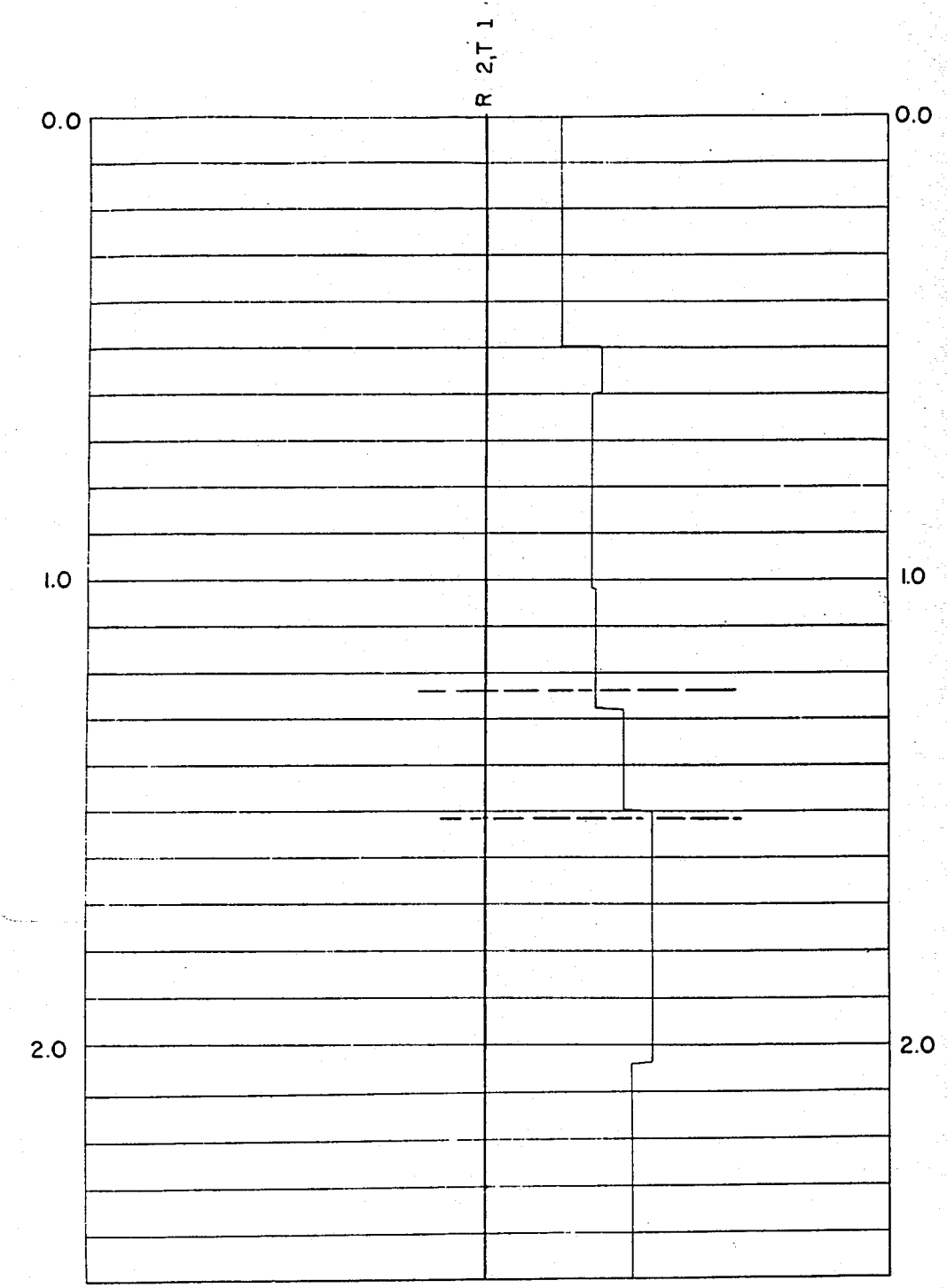
FIG. 4 shows an interval velocity log produced by a velocity spectra technique from the same seismograms.
Figure 5:
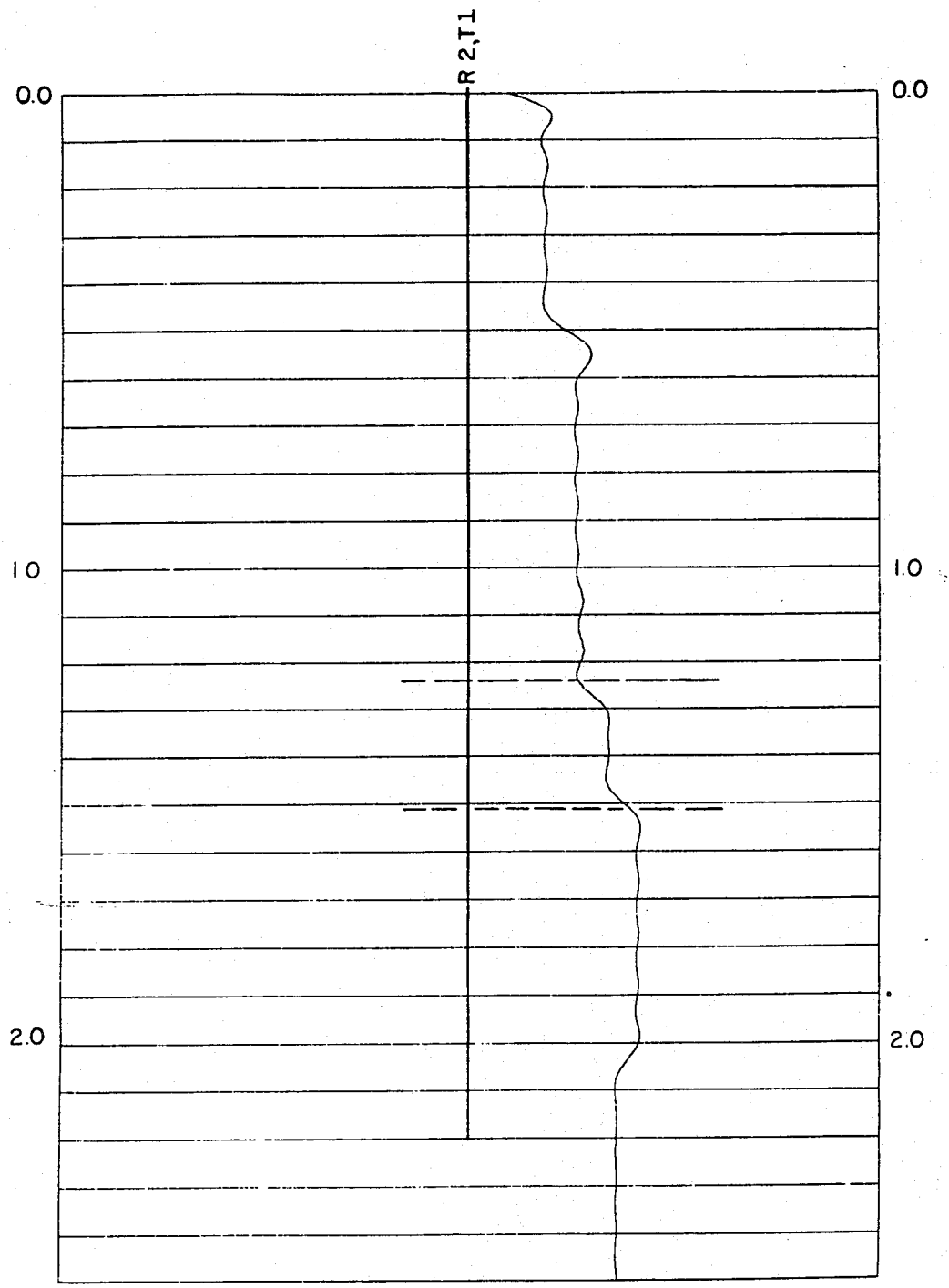
FIG. 5 shows the band limited velocity function obtained from FIG. 4.
Figure 6:
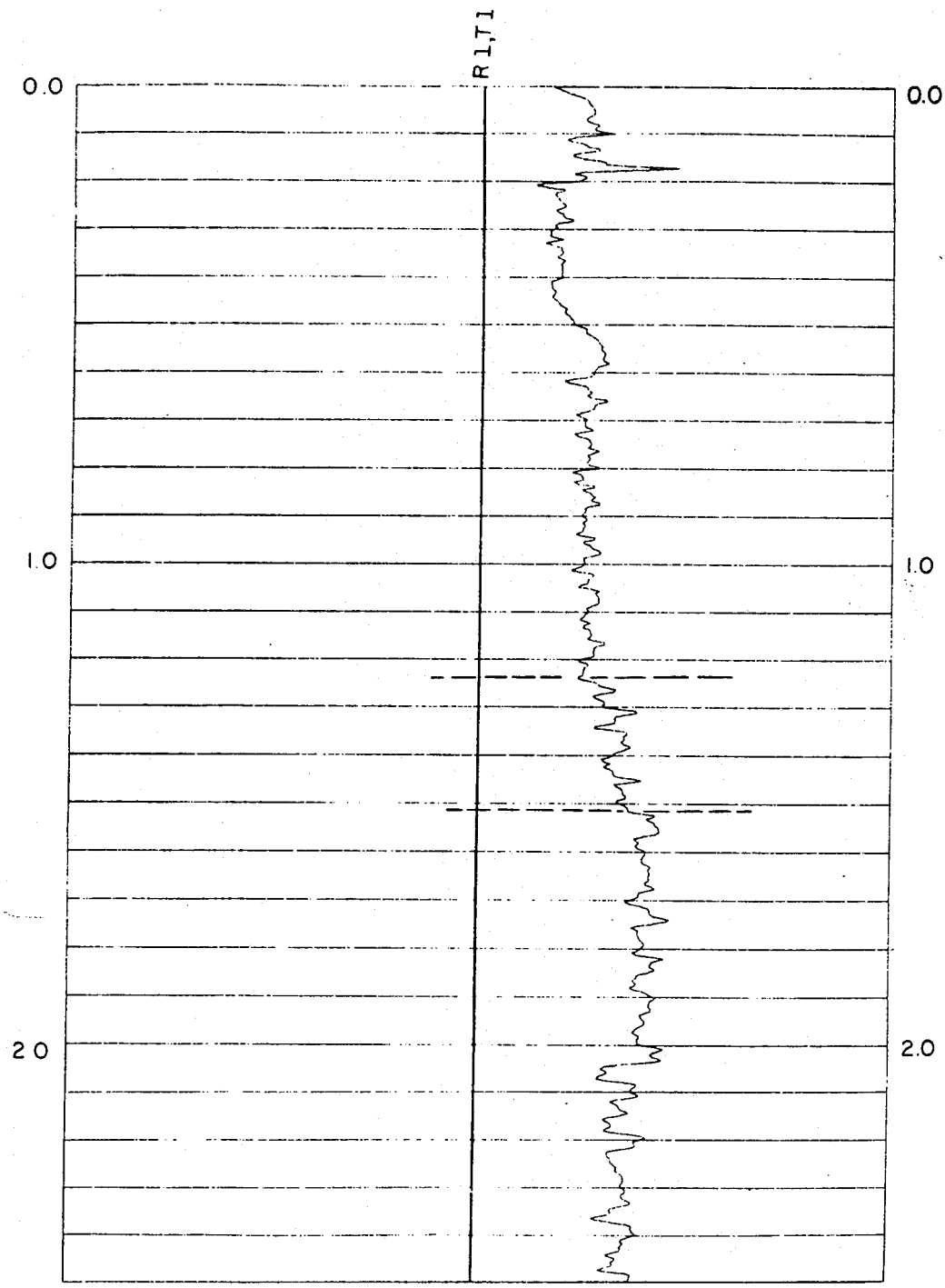
FIG. 6 shows the synthetic acoustic velocity log produced in accordance with the present invention.

An actual example of the results of the present invention is shown in FIGS. 2-6. FIG. 2 is a log of acoustic velocity obtained from a well bore. This well traverses a thick gas containing layer which is represented on the acoustic log by the portion between the dashed lines. Seismograms obtained from the same area contained an amplitude increase at approximately the same depth. These seismograms were stacked and deconvolved to produce the reflectivity function of FIG. 3. The field seismograms were also processed by the VIP/DIP process of the aforementioned Guinzy et al patents to produce the interval velocity log of FIG. 4. Inspection of FIG. 4 will show that the predominate spectrum will be at F=0 and up, with small contributory high frequency terms. We limit the spectrum of FIG. 4 to have only the low frequency terms which have been removed from FIG. 3. The interval velocity log of FIG. 4 was transformed into the frequency domain, band limited to suppress frequencies in the seismic band and, transformed back into the time domain which is shown in FIG. 5. The band limited reflectivity function, FIG. 3, and the band limited velocity function, FIG. 5, were combined to produce the synthetic acoustic log of FIG. 6. FIG. 6 shows good correllation with the well log of FIG. 2. This example shows that good synthetic logs can be obtained and used in areas where no wells exist to identify formations of interest such as the formation between the dashed lines.

The foregoing can be better understood from the following description of the underlying theory. For convenience to those skilled in geophysical processing, a precise mathematical description is given below. It will be understood that while mathematical expressions are used to precisely define the various steps of the invention, these steps are physical steps which are performed on a digital processor or other apparatus commonly used in seismic processing. The terms "deconvolving", "transforming", "filtering", and "combining" as used herein mean the operations performed on this apparatus. The reflectivity function is related to the acoustic impedance Z by the following:

$$r(t) = \frac{1}{2} \frac{\delta}{\delta t} \ln Z \tag{1}$$

When $\ln Z$ represents the natural logorithm of Z.
The frequency domain representation of reflectivity is:

$$R(f) = \frac{1}{2} \frac{1}{j\omega} F(\ln Z) \tag{2}$$

In digital processing, the reflectivity function is represented by a series of frequencies as follows:

$$r(t) = \sum_{i=1}^{x} R(f_i) e^{j\omega_i t} \tag{3}$$

For the purpose of the present invention, these frequencies are divided into two groups, one below the lower limit of the seismic band and the other above:

$$r(t) = \sum_{i=1}^{N} R(f_i) e^{j\omega_i t} + \sum_{i=N}^{x} R(f_i) e^{j\omega_i t} \tag{4}$$

$$r(t) = R_1 + R_2 \tag{5}$$

These two components are related to acoustic impedance as follows:

$$R_1 = \left[ \frac{1}{2} \frac{1}{j\omega} F(\ln Z) \right]_1, r_1 = \left[ \frac{1}{2} \frac{\delta}{\delta t} \ln(Z) \right]_1 \tag{6}$$

$$R_2 = \left[ \frac{1}{2} \frac{1}{j\omega} F(\ln Z) \right]_2, r_2 = \left[ \frac{1}{2} \frac{\delta}{\delta t} \ln(Z) \right]_2 \tag{7}$$

The components in the seismic band are represented by:

$$\ln Z_2 = 2 \int r_2 dt + C \tag{8}$$

$$Z_2 = C_2 e^{2 \int r_2 dt} \tag{9}$$

The components below the seismic band are represented by:

$$Z_1 = Z\big|_{t_0}^{t_1} \tag{10}$$

The synthetic acoustic log of the present invention is represented by:

$$Z = Z_1 + \sum_{i=i}^{x} C_i e^{2 \int r_i dt} \tag{11}$$

One example of a computer system which is suitable for use is supplied by Control Data Corporation and includes a Cyber 175 central processor with one or more peripheral processors, extended core storage and tape drives. The specific programming required will be apparent from the foregoing, from the users' manual for the particular computer system used, and from Simpson, TIME SERIES COMPUTATIONS IN FORTRAN AND FAP, ADDISON, TIME SERIES ANALYSIS WITH DIGITAL COMPUTER PROGRAMS, Holden-Day, San Francisco, 1967.

While a particular embodiment has been shown and described, modifications are within the true spirit and scope of the invention. The appended claims are, therefore, intended to cover all such modifications.

I claim:

1. In seismic exploration wherein field seismograms represent the reflection of seismic energy received as a function of time at spaced locations along a line of exploration, the method of producing an improved synthetic acoustic log from said seismograms comprising:
   deconvovling said field seismograms to form a reflectivity function;
   transforming said reflectivity function into a frequency domain representation of reflection amplitudes as a function of reflection frequency;
   filtering said frequency domain representation to suppress all freqencies below the seismic pass band whereby a band limited reflection function is formed;

generating from said field seismograms velocity spectra representing the signal power of said reflections as a function of acoustic velocity;

generating from said velocity spectra an acoustic velocity log representing the acoustic velocity of the earth as a function of time;

transforming said acoustic log into a frequency domain representation of amplitude as a function of frequency;

filtering said last named frequency domain representation to suppress all frequencies in the seismic pass band, whereby a band limited velocity function is obtained;

transforming said band limited reflectivity and velocity functions into the time domain; and combining the time domain representations of said reflectivity and velocity functions to form a synthetic acoustic log.

2. The method recited in claim 1 further comprising: compositing said field seismograms to form a stacked seismic section representing the reflection of seismic energy as a function of said time and distance along said line of exploration; and thereafter performing said steps of deconvolving, transforming and filtering to form said band limited reflectivity function from said stacked seismic section.

3. The method recited in claim 1 further comprising:

generating an average velocity log from said velocity spectra;

generating an interval velocity log from said average velocity log; and thereafter performing said steps of transforming, and filtering to form said band limited velocity function from said interval velocity log.

4. The method recited in claim 1 further comprising:

integrating and exponentiating sand band limited reflectivity function prior to combining.

* * * * *